Figure 1A:
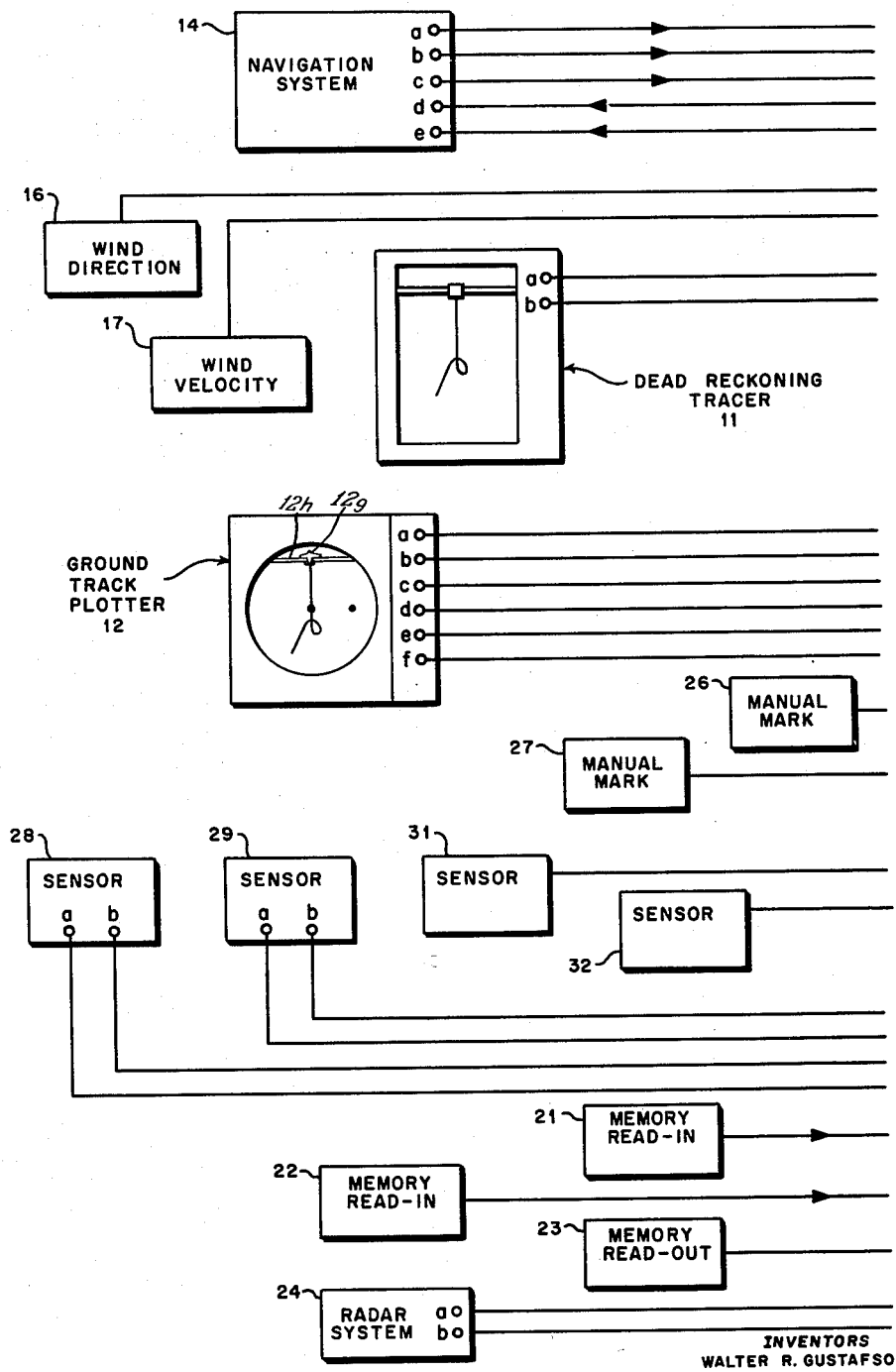

May 25, 1965 W. R. GUSTAFSON ETAL 3,185,980
AIRBORNE INTEGRATED DISPLAY SYSTEM
Filed Sept. 8, 1961 3 Sheets-Sheet 3

Fig. 3a RADAR

Fig. 3b SENSORS

Fig. 3c WIND MODE

Fig. 3d TARGET MODE

Fig. 3e CIRCLE SOLUTION

INVENTORS
WALTER R. GUSTAFSON
WILLIAM H. McMILLEN
JAMES R. ROUNDING, JR.
LEO SHORE
BY
ATTORNEY

United States Patent Office 3,185,980
Patented May 25, 1965

3,185,980
AIRBORNE INTEGRATED DISPLAY SYSTEM
Walter R. Gustafson, Furlong, William H. McMillen, Levittown, James R. Rounding, Jr., Doylestown, and Leo Shore, Abington, Pa., assignors to the United States of America as represented by the Secretary of the Navy
Filed Sept. 8, 1961, Ser. No. 137,943
10 Claims. (Cl. 343—6)
(Granted under Title 35, U.S. Code (1952), sec. 266)

The invention described herein may be manufactured and used by or for the Government of the United States of America for governmental purposes without the payment of any royalties thereon or therefor.

The present invention relates to airborne integrated display systems and more particularly to airborne integrated tactical data display systems adapted for use in the performance of anti-submarine warfare missions.

It is generally recognized that, in order to keep pace with the increasing threat of enemy submarines, there is a critical need for aircraft equipped with completely integrated anti-submarine warfare systems. The evolution of operational concepts relating to anti-submarine warfare has emphasized the importance of the team concept in anti-submarine warfare. In order to effectively utilize data obtained by operation of navigation, search, detection, classification, and localization equipment installed in anti-submarine warfare aircraft, it is essential that the efforts of the equipment operators be closely coordinated and that the data obtained by operation of equipment of the type mentioned above be transmitted, reduced, and displayed in a manner which not only permits rapid data analysis but which also facilitates the tactical decision making process and permits effective implementation of tactical decisions.

A number of effective navigation and target detecting devices have been available for use in anti-submarine warfare aircraft. However, prior to the present invention, anti-submarine warfare aircraft were provided only with the radio intercommunication system for the transmission of data derived from navigation and target detecting devices installed therein and no central provision was made to collect, store, display, correlate, and evaluate the information from the navigation system and from sensory systems such as radar, sonar, magnetic airborne detectors, and the like. Without a coordinated data display system, each detecting device required a highly skilled operator at the controls thereof with each operator evaluating the data received by him without respect to other information sources. Each operator tended to jam the intercommunication system with bits and pieces of information that could not be adequately recorded or properly evaluated. Occasionally, without much success, attempts were made to manually construct a tactical plot to aid in the correlation and evaluation of data received by voice communication from equipment operators. Greatly increased submarine performance capabilities, together with the increasing sophistication and complexity of a submarine detecting and tracking devices, have made voice data transmission and manual data plotting methods wholly inadequate to permit the successful accomplishment of anti-submarine warfare missions.

The airborne integrated display system of the present invention was developed to fill the need for a system to coordinate, evaluate, and display anti-submarine warfare tactical information, and to provide for an orderly transition between aircraft navigation, search and detection, localization, and attack phases of an anti-submarine warfare problem. According to the invention, display, programing, computing, and data transmission systems are provided which are compatible with the performance of existing and contemplated data gathering and navigation equipment. The airborne integrated display system concept embodies the use of a tactical coordinator as the focal member of an anti-submarine warfare team. By use of the systems of the present invention all relevant tactical and navigational data may be presented in graphic visual form to the tactical coordinator. By operation of program controls he may select any desired portion of the available data for his consideration and evaluation, and, by manipulation of programing, computing, and data transmission facilities made available to him, he may present reduced data in graphic visual form to other members of the team.

The airborne integrated display system comprises four major groups of equipment: an electronic plotter, a dead reckoning tracer, a ground track plotter, and the coordinating and computing elements of a data display group. The data display group not only provides for the interconnection of the electronic plotter, the dead reckoning tracer, and the ground track plotter, but also provides for connection of the integrated display system to existing navigation and sensory systems and further provides additional computing facilities. The dead reckoning tracer and the ground track plotter are coupled through the data display group to the aircraft's navigation system to provide continuous plots of the ground track of the aircraft. The electronic plotter is employed by the tactical coordinator to display, store, and evaluate various data received from associated equipment and to determine the location of a suspected target. This location is transmitted to the ground track plotter. The dead reckoning tracer is employed by the navigator to assist him in navigating the aircraft and to provide a means whereby significant data may be recorded manually by him for record purposes and for later analysis, while the ground track plotter is employed by the pilot in a manner to permit him to navigate the aircraft to the location of a suspected target and to accomplish a successful attack thereon.

It is, therefore, an object of the present invention to provide an airborne integrated data display and processing system to aid in the successful accomplishment of all phases of an anti-submarine warfare mission.

It is another object of the present invention to provide a data display and processing system compatible with the capabilities of airborne navigation and target detection systems.

It is another object of the present invention to provide in an anti-submarine warfare aircraft central provision for the collection, storage, display, correlation, and evaluation of information available from navigation, communications, and target detection systems, or the like.

It is another object of the present invention to provide an airborne integrated data transmission, processing, and display system whereby the efforts of a plurality of crew members may be coordinated to permit the successful accomplishment of anti-submarine warfare missions.

Figure 1B:
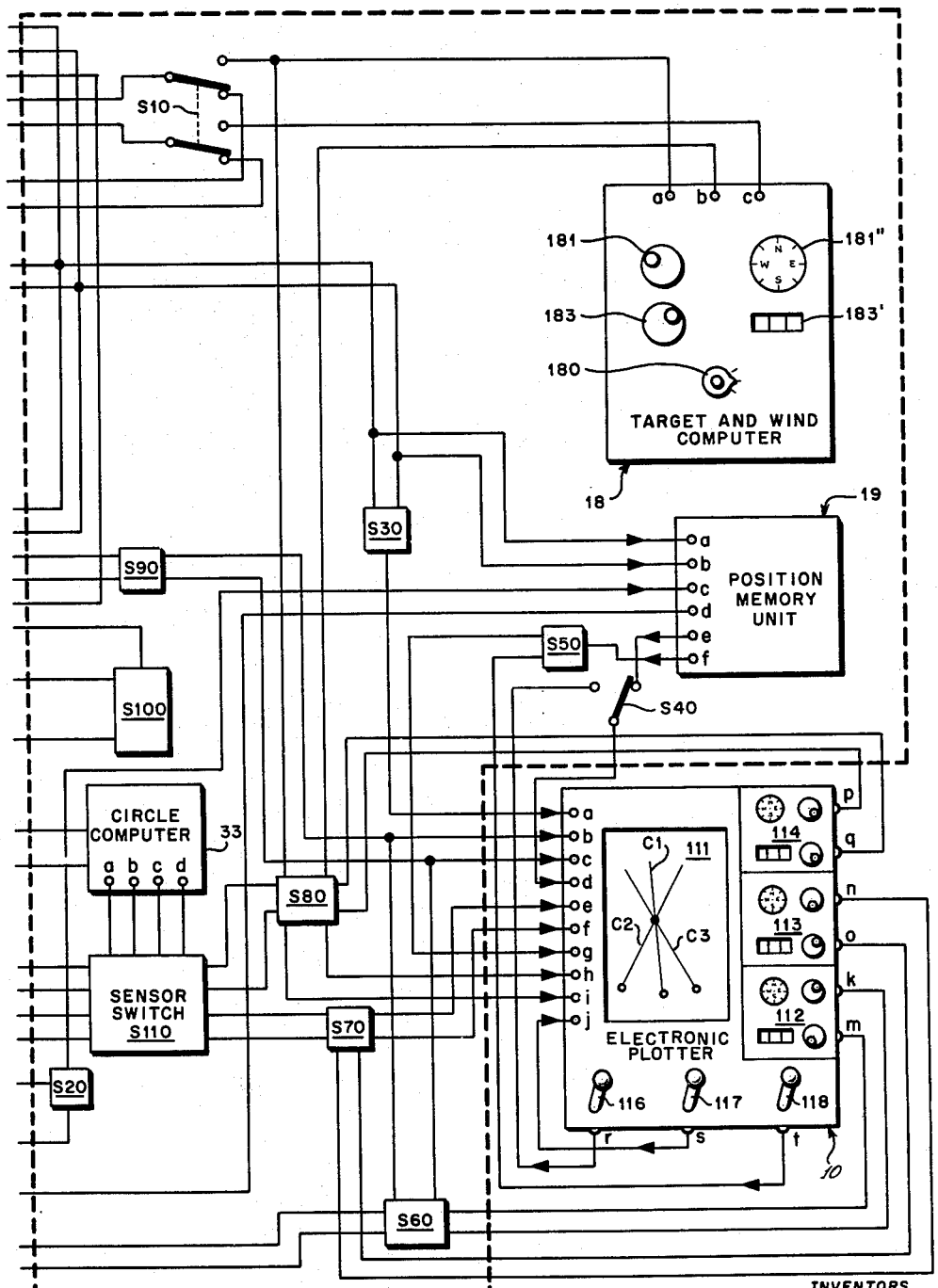
Figure 2:
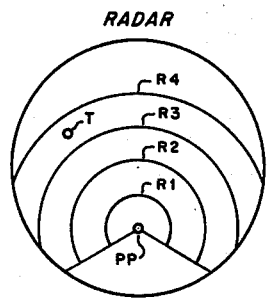
Figure 2:
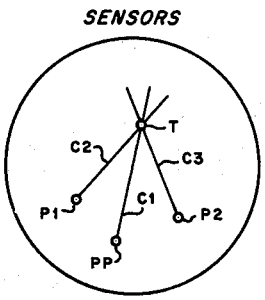
Figure 2:
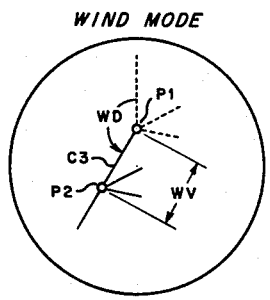
Figure 2:
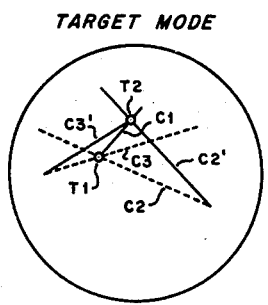
Figure 2:
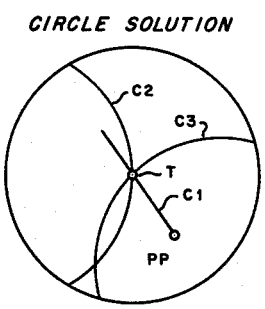
Figure 2:
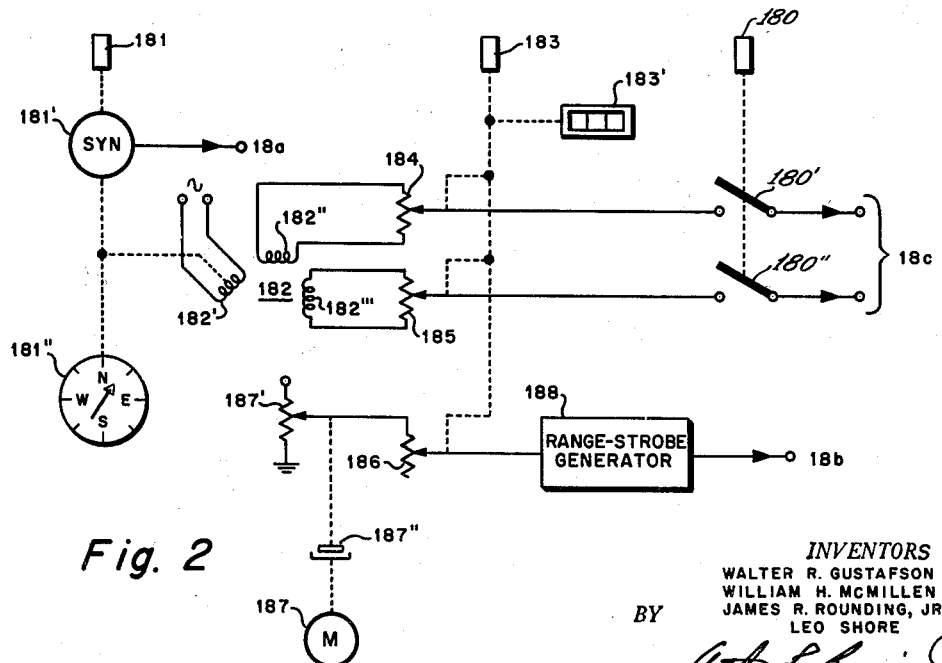

Other objects and many of the attendant advantages of this invention will be readily appreciated as the same become better understood by reference to the following detailed description when considered in connection with the accompanying drawings wherein:

FIGS. 1a and 1b illustrate an embodiment of the invention in block diagram form, FIG. 2 schematically shows a wind and target vector computer used in embodiments of the invention, and FIGS. 3a through 3e illustrate cathode ray tube displays wherein the cathode ray tube is embodied in an electronic plotter which may be employed in the present invention.

For convenience, in describing an illustrative embodiment of the invention, the pertinent phases of an anti-submarine warfare mission will be considered to comprise navigation, search and detection, localization, and attack. These functional classifications are not intended to imply any limitation upon the manner in which the invention may be practiced but are intended only to facilitate an understanding thereof since the great inherent flexibility embodied in the invention permits many modes of operation thereof.

By way of introduction, before proceeding with a description of the navigation phase, it will be noted by reference to FIGS. 1a and 1b that the embodiment of the invention illustrated therein comprises, in addition to primary sensors and a navigation system, the tactical coordinator's electronic plotter 10, the navigator's dead reckoning tracer 11, the pilot's ground track plotter 12, and a data display group 13 which provides necessary computing, storage, and programing functions to coordinate the three display systems previously mentioned. Data display group 13 is operated by the tactical coordinator.

*Navigation*

Referring now again to FIGS. 1a and 1b, there is shown a navigation system 14 which provides at terminals 14a, 14b, respectively, signals representing the north-south and east-west components of the aircraft ground track, and at terminal 14c a signal representing the instantaneous heading of the aircraft.

The navigation system and other prime information sources shown in FIGS. 1a and 1b do not per se form any part of the present invention. Accordingly, no detailed descriptions thereof will be given. However, in order to facilitate an understanding of the invention, it is noted that navigation system 14 may be of the dead reckoning type which operates upon true airspeed, compass heading, wind direction, and wind velocity parameters to provide the required ground track and heading signals. Signals from wind direction and wind velocity units 16, 17 may be coupled through a switching means S10 in data display group 13 and applied to terminals 14d and 14e of navigation system 14. Alternatively, the wind direction and velocity signals may be obtained from a target and wind computer 18 in data display group 13, as will be more fully set forth below, and coupled through switching means S10 for application to terminals 14d, 14e. Wind direction and wind velocity units 16, 17 may be manually operable devices or may comprise portions of a Doppler radar navigation system of a type currently in use.

In preferred embodiments of the invention, data transmission generally is by synchro data links. Accordingly, the ground track and aircraft heading signals provided by navigation system 14 may be in the form of synchro voltages.

The ground track signals are coupled through data display group 13 and applied to terminals 11a, 11b of dead reckoning tracer 11 and to terminals 12a, 12b of ground track plotter 12. Dead reckoning tracer 11 is a conventional two-coordinate plotter in which the aircraft ground track is recorded and continuously displayed with respect to an arbitrarily chosen origin by the engagement of a stylus with a recording media, the stylus being continuously positioned in accordance with the ground track signals applied to terminals 11a, 11b. Ground track plotter 12 is described in Patent No. 2,977,177 issued to McLaughlin et al. on March 24, 1958, on an invention entitled, "Aircraft Flight Path Recording Device." Insofar as the recording and display of the aircraft ground track is concerned, ground track plotter 12 is similar to dead reckoning tracer 11. Display of aircraft heading in ground track plotter 12 is accomplished by the provision of an aircraft representation 12g, associated with the ground track plotter stylus 12h, which is rotated in accordance with aircraft heading signals received from navigation system 14 and coupled to terminal 12e. Other functions performed by ground track plotter 12 will be set forth hereinbelow.

The aircraft ground track signals are further coupled from navigation system 14 through data display group 13 to input terminals 19a, 19b of a plural channel position memory unit 19. When it is desired to store the position of the aircraft at the time some significant event occurs, such as the detection of a suspected target, one of a plurality of memory read-in devices 21, 22 may be actuated. Memory read-in devices 21, 22, which may be manually operable, are coupled through switching means S20 to input terminal 19c of position memory unit 19. The provision of switching means S20 permits the tactical coordinator to assign the memory read-in function to any selected crew member, for example, the electronic counter measures equipment operator. Memory readout is accomplished by actuation of a memory readout unit 23 which is coupled to input terminal 19d of memory unit 19. Upon actuation of memory readout 23, which may be manually operable, aircraft displacement signals which have been stored in a selected channel appear at output terminals 19e, 19f of the position memory unit.

The manner in which the stored aircraft displacement signals may be utilized will be described below.

Since a large number of storage and memory units are known to the art, no detailed description of position memory unit 19 may comprise a pair of servo systems tive purposes, it is noted that each channel in position memory unit 19 may comprise a apir of servo systems each coupled to be energized by the ground track signals received from navigation system 14 and coupled through a clutching means to actuate one or more potentiometer wiper arms. When it is desired to store a set of ground track signals, the wiper arms of a pair of potentiometers in the selected channel may be declutched from the associated servo systems. Memory readout may be accomplished by coupling output terminals 19e, 19f through one or more manually operable rotary switches to a selected channel.

The aircraft ground track signals from navigation system 14 may further be coupled through switching means S30 in data display group 13 and applied to input terminal 10a of electronic plotter 10 to position the origin of a cursor C1 displayed upon the screen of cathode ray tube 111 which comprises the principal display element of electronic plotter 10. Thus, the origin of cursor C1 continuously represents the present position of the aircraft with respect to the remainder of the display generated upon the screen of the cathode ray tube.

The nature of the mentioned display will be set forth below in part by reference to FIGS. 3a through 3e.

Electronic plotter 10 may comprise the AN/APA–125 Indicator described in an unclassified publication, NAVAER 16–30 APA 125, entitled, "Handbook of Service Instructions," published September 1, 1959. Since the indicator is described in detail in the referenced handbook, for the sake of brevity, only a functional description thereof will be herein given.

In addition to cursor C1, electronic plotter 10 is operable to generate and display two additional independently controllable cursors C2, C3. Input terminals 10d, 10g may be respectively coupled through switching means S40, S50 to output terminals 19e, 19f of position memory unit 19 to provide origin positioning signals for cursors C2, C3, respectively. Cursors C2, C3 may therefore be positioned in accordance with significant aircraft locations which have been previously stored in position memory unit 19. Alternatively, the origins of cursors C2, C3 may be located upon the screen of cathode ray tube 111 in accordance with positioning voltages generated by operation of slew controls 116, 118 wherein the positioning voltages are coupled from terminals 10r, 10t through switching means S40, S50 and applied to input terminals 10d, 10g.

In the AN/APA–125, the entire display may be slewed by manipulation of slew control 117 which provides a display slew voltage of output terminal 10s coupled to input terminal 10j. (For graphic purposes all connections are shown in FIG. 1b to be external.)

Azimuth and range strobe signal generators associated with electronic plotter 10 are provided for each of cursors C1, C2, and C3, and in FIG. 1b are designated, by reference numerals 112, 113, and 114. Cursor bearing signals available at terminals 10k, 10n, and 10p are respectively coupled through switching means S60, S70, S80 and applied to input terminals 10b, 10e, 10h to control the azimuth orientation of cursors C1, C2, and C3. Range strobe signals are coupled from terminals 10m, 10o, 10q through switching means S60, S70, S80 and applied to input terminals 10c, 10f, 10i to control the position of range strobes along cursors C1, C2, C3. The azimuth signals may be in the form of synchro voltages, while the range strobe signals may be in the form of pulses derived from phantastron delay circuits and applied as video signals to cathode ray tube 111. Azimuth and range strobe signal generators 112, 113, 114 are shown in FIG. 1b as being provided with manually operable head cranks associated with appropriate dial and counter type indicators. The range strobe cranks may be coupled to potentiometer wiper arms to provide direct control voltages coupled to the phantastron delay circuits while the azimuth cranks may be coupled to synchro transmitter rotors.

Antenna azimuth and video signals from a radar system 24 may be coupled through switching means S60 and applied to input terminals 10b, 10c, whereby as shown in FIG. 3a, a ground stabilized search radar presentation is generated on the screen of cathode ray tube 111 by cursor C1. In FIG. 3a, the present position of the aircraft is designated by reference letters PP, range marks are designated by reference characters R1, R2, R3, R4 and a target is indicated by the reference letter T.

Wind velocity and direction signals for application to navigation system 14 may be generated by operation of target and wind computer 18 in conjunction with the ground stabilized radar presentation on cathode ray tube 111. The manner in which this may be accomplished may be best understood by conjoint reference to FIGS. 1b, 2, and 3c.

Target and wind computer 18 may include an azimuth signal generator and a range strobe signal generator similar to that provided for electronic plotter 10 and may also include a timing motor to permit the generation of a velocity signal proportional to range rate. One suitable form which the computer may take is schematically illustrated in FIG. 2.

Referring now to FIGS. 1b, 2, and 3c, when it is desired to obtain wind direction and velocity data for application to the navigation system 14, the tactical coordinator switches origin control for cursor C3 to slew control 118 by operation of switching means S80, and by operation of switching means S80 he switches cursor bearing and range strobe control for cursor C3 to target and wind computer 18. Selector switch 180 of target and wind computer 18 is actuated to the wind mode position, closing contacts 180', 180'' (FIG. 2) and providing energizing voltages for the circuitry shown in FIG. 2. By manipulation of slew control 118, the origin of cursor C3 is located adjacent a radar feature. In FIG. 3c the location of the radar feature is designated by the reference character P1.

Referring now particularly to FIG. 2, a timing motor 187 is then energized and coupled through a clutching means 187'' to the wiper arm of a potentiometer 187'. Some time later, assuming that the radar feature has drifted upon the screen of cathode ray tube 111, hand crank 181 is actuated rotating the rotor of a synchro transmitter 181' to provide a cursor bearing signal at terminal 18a for application through switching means S80 to input terminal 10h of electronic plotter 10 to thereby rotate cursor C3 until the cursor passes through the present location of the radar feature, designated in FIG. 3c by the reference letter P2.

The cursor bearing represents the wind direction since it is assumed that the drifting of the radar feature may be entirely attributed to wind effects. Accordingly, the cursor bearing signal appearing at terminal 18a may be considered proportional to wind direction and is coupled through switching means S10 and applied to input terminal 14d of navigation system 14.

Manipulation of hand crank 181, in addition to positioning the rotor of synchro transmitter 181', further functions to position the rotor 182' of a resolver 182, for a purpose to be later described, and at the same time positions the needle of a dial type indicator 181'' to provide a visual indication of wind direction at the tactical coordinator's station.

In determining wind velocity, hand crank 183 is actuated to position the wiper arm of a potentiometer 186 energized from potentiometer 187' to provide a direct control voltage for a range strobe generator 188 (which may comprise one of the phantastron delay circuits described above) to thereby provide a range strobe signal at terminal 18b for application as a video signal through switching means S80 to input terminal 10i of electronic plotter 10. The wiper arms of potentiometers 184, 185 are concurrently positioned with that of potentiometer 186. Manipulation of hand crank 183 is continued until the range strobe on cursor C3 is located adjacent the present position of the radar feature.

Since the voltage appearing on the wiper arm of potentiometer 187' and applied to potentiometer 186 is proportional to time and since the wiper arm of potentiometer 186 has been actuated in accordance with the apparent distance traversed by the radar feature in a given period of time, the wiper arms of potentiometers 184, 185 are positioned in accordance with wind velocity. As mentioned above, the rotor 182' of a resolver 182 is angularly positioned in accordance with wind direction. The voltages induced in stator windings 182'', 182''' therefore are proportional to sin WD and cos WD (where WD is the wind direction). Accordingly, the signals appearing on the wiper arms of potentiometers 184, 185 are proportional to the quadrature components of wind velocity.

The wind velocity signals are coupled from terminal means 18c through switching means S10 and applied to input terminal 14e of navigation system 14. The quadrature form for wind velocity signals has been selected since navigation systems constructed to function with Doppler radar systems are frequently designed to accept wind velocity data in this form.

A counter type indicator 183' is provided and coupled to be actuated by hand crank 183 in order to provide a visual indication of wind speed at the tactical coordinator's station.

The manner in which wind and target computer 18 may be employed to determine target velocity will be described in the next section.

*Search*

During the search phase of an anti-submarine warfare mission the presence and the approximate location of suspected targets are determined. While not specifically related to the present invention, it may be noted that during the search phase equipment installed in an anti-submarine warfare aircraft may be operated to determine the nature of suspected targets. This process is called "classification." No description of classification equipment will be given in this specification.

Surface targets and snorkling submarines may be detected and located by operation of radar equipment. Accordingly during the search phase radar systems installed in the anti-submarine warfare aircraft are operated as described in the preceding section to present on cathode ray tube 111 a ground stabilized radar presentation of the plan position type as shown in FIG. 3a.

Electronic counter measures (ECM) equipment of the type operative to determine the bearing to a radiating target may also be employed during the search phase. In FIG. 1a, sensor 28 designates equipment of this type. The location of the aircraft at the time of an ECM contact is stored in position memory unit 19 by operation of one of memory read-in devices 21, 22, control of which is assigned by the tactical coordinator to the ECM operator by operation of switching means S20. Target bearing is then determined by operation of the ECM equipment to provide a bearing signal at terminal 28a of sensor 28. Sometime later by further operation of the ECM equipment, target bearing is again determined to provide a second bearing signal at terminal 28b of sensor 28 and the location of the aircraft at this time is stored in position memory unit 19. Thereafter, by operation of switch means S40, S50 origin control of cursors C2, C3 is switched to position memory unit 19 whereby the origins of cursors C2, C3 represent the locations of the aircraft at the time of successive ECM contacts. By operation of sensor switch S110 bearing control of cursors C2, C3 is switched to sensor 28 whereby cursors C2, C3 are rotated in accordance with the bearing signals appearing at terminals 28a, 28b.

As indicated in FIG. 3b, the intersection of cursors C2, C3 designate the approximate location of the suspected target with respect to the present position of the aircraft as represented by the origin (PP) of cursor C1. Successive aircraft positions are designated by P1, P2 in FIG. 3b. A target track may be constructed by marking successive target locations on the screen of cathode ray tube 111 (or upon a reflection plotter associated therewith) with a grease pencil or the like.

Acoustic target detection and locating apparatus may also be employed during the search phase. Sensor 29 (FIG. 1a) designates a sonobuoy receiving system which may be associated with bearing only, range only, or range and bearing sonobuoys. In employing equipment of this type, the location of the aircraft at the time of two or more successive sonobuoy drops is stored in position memory unit 19 by operation of memory read-in device 21 or 22, control of which has been transferred to the sonobuoy chute operator by operation of switching means S20. By operation of switching means S40, S50 origin control of cursors C2, C3 is again transferred to position memory units 19 whereby the origins of cursors C2, C3 represent the locations of the aircraft at the time of successive sonobuoy drops with respect to the present position of the aircraft as represented by the origin of cursor C1.

Assuming that the sonobuoys are of the bearing only type, operation of sensor 29 provides at the terminals 29a, 29b thereof target bearing signals derived from a pair of sonobuoys. Actuation of sensor switch S110 couples input terminals 10e, 10h of electronic plotter 10 to terminals 29a, 29b whereby cursors C2, C3 are rotated in accordance with the target bearing signals.

Operation with range only sonobuoys is similar except that cursor bearing control is retained by the tactical coordinator but cursor range strobe control is transferred to sensor 29 by operation of sensor switch S110 to couple terminals 29a, 29b to input terminals 10f, 10i of electronic plotter 10. The range strobes on cursors C2, C3 accordingly will be positioned in accordance with range signals received from sensor 29. By operation of cursor azimuth signal generators 113, 114, cursors C2, C3 are rotated until the range strobes thereon coincide.

With range and bearing sonobuoys, both cursor azimuth and range strobe control are assigned to the sonobuoy receiving system operator.

In all modes of sonobuoy operation, by observing and marking the intersections of cursors C2, C3, a target track may be constructed as above described.

The descriptions above as to the manner in which the present invention may be employed with various target detecting and locating systems are by no means exhaustive, but are intended to be illustrative only.

During the search phase, it may be desirable to indicate on ground track plotter 12 the locations of the aircraft at the time of ECM contacts and sonobuoy drops, for example.

As indicated by the showing of ground track plotter 12 in FIG. 1a, operation of one of manual mark controls 26, 27 which are respectively coupled through switching means S100 to input terminal 12f energizes a stylus control mechanism in ground track plotter 12 to cause the stylus to construct a small circle lying on the ground track trace. The tactical coordinator may assign manual mark controls 26, 27 to a selected crew member by operation of switching means S100.

Target and wind computer 18 may be employed during the search phase to obtain an estimate of target velocity, if desired. Selector switch 180 is rotated to the target position to apply energizing voltages to the circuitry shown in FIG. 2. In the target mode contacts 180', 180'' remain in the open position. As shown in FIG. 3d, target location (T1) is determined using cursors C2, C3 and is marked on the screen of cathode ray tube 111. Timing motor 187 is then energized and coupled through clutching means 187'' to potentiometer 187'. Sometime later, the target location is again determined (T2) and marked upon the screen of cathode ray tube 111. Origin control of cursor C3 is then switched to slew control 118 by operation of switching means S50. Bearing and range strobe control of cursor C3 is transferred to target and wind computer 18 by operation of switching means C80. Slew control 118 is operated to position the origin of cursor C3 adjacent the first marked target location. Thereafter, hand cranks 181, 183 of target and wind computer 18 are actuated to rotated cursor C3 until the cursor passes through the second marked target location and the range strobe thereon is located adjacent this target location. Target velocity data is then made available to the tactical coordinator on indicators 181'', 183'.

Once a target has been detected and it has been determined that the target is of interest, the target must be localized, that is, the location thereof with respect to the position of the aircraft must be determined and, in order to permit the pilot to operate the aircraft to the vicinity of the target, the location thereof must be visually displayed on the pilot's ground track plotter. The manner in which this may be accomplished is set forth in the next section.

*Localization and attack*

During the localization phase, target location may be determined by operating ECM equipment and sonobuoy receiving system 29 in the manner described in the preceding section. The manner in which target location may be displayed upon the pilot's ground track plotter 12 will now be described.

By operation of switching means S60, cursor bearing and range strobe control for cursor C1 is switched to cursor azimuth and range strobe generator 112. As shown in FIG. 3b cursor C1 is then rotated to pass through the intersection of cursors C2, C3 and the range strobe on cursor C1 is positioned adjacent the common intersection. The orientation of cursor C1 represents target bearing and the range strobe thereon is positioned in accordance with target range, both with respect to aircraft present position. The cursor azimuth and range strobe control voltages, accordingly, are proportional to target bearing and range and are coupled through switching means S90 and applied to terminals 12c, 12d of ground track plotter 12.

Ground track plotter 12 is provided with a mode switch (not shown) which permits the selection of off-course or target center track modes. Assuming that the off-course mode has been selected, application of target bearing and range signals to terminals 12c, 12d energizes a stylus control mechanism in ground track plotter 12 which causes the stylus to be translated to a position on the plotting surface relative to the ground track being traced thereon corresponding to target range and bearing and to describe a small circuit at this location. When the target center mode has been selected, application of target bearing and range signals to terminals 12c, 12d will cause the stylus to initiate a new ground track trace using the target location as an origin. The manner in which these functions are accomplished in ground track plotter 12 is fully set forth in the above referenced patent and will therefore not be described herein.

In addition to the above described target detecting and locating systems, sonobuoys, sonobuoy data processing circuitry, and related equipment have been developed which permit circular solutions to determine target location. In FIGS. 1a, 1b, systems of this latter type are designated by sensors 31, 32, and circle computer 33. For illustrative purposes, sensors 31, 32 may be considered to comprise sonobuoy receiving systems operators to provide direct voltages proportional to the range between a pair of sonobuoys and a target. Circle computer 33 may therefore include a pair of range strobe generators, similar to those described above, coupled to be controlled by the range voltages available from sensors 31, 32. A pair of motor driven synchro transmitters may also be included in circle computer 33 to provide cursor bearing control signals.

In operating equipment of this type, cursor bearing and range strobe signals, available at terminals 33a, 33b, 33c, and 33d of circle computer 33, are coupled through sensor switch S110 and applied to input terminals 10e, 10f, 10h, 10i to cause cursors C2, C3 to describe on the face of the cathode ray tube 111 intersecting circles, about origins corresponding to the locations of the aircraft at the time of sonobuoy drops, as shown in FIG. 3e. Sonobuoy drop locations have been previously stored in position memory unit 19 and are coupled from output terminals 19e, 19f thereof through switching means S40, S50 to input terminals 10d, 10g to position the origins of cursors C2, C3. The circle intersections represent possible target locations. As before, the tactical coordinator manipulates cursor C1 to provide target location data which is coupled to the pilot's ground track plotter 12.

Target location ambiguity may then be resolved by pilot judgment or, after the aircraft has been piloted to the vicinity of the target, the location thereof may be verified by operation of equipment such as magnetic anomaly or exhaust trail detectors and the aircraft location at the time of contact may be indicated upon the ground track plot by manipulation of one of manual mark controls 26, 27, assigned to the pilot or to equipment operators by the tactical coordinator by operation of switching means S100.

Target center mode may be selected in ground track plotter 12, and thereafter, by observing the ground track, the pilot may maneuver the aircraft to the target location and he or another crew member may then activate appropriate armament systems installed in the aircraft to accomplish an attack on the target.

There has been described above an airborne integrated display system which permits the full capabilities of navigation, target detection, and target locating systems to be fully exploited and which permits the efforts of crew members in an anti-submarine warfare aircraft to be fully coordinate to thereby enhance the prospects of success in the performance of anti-submarine warfare missions.

While a specific embodiment of the invention has been described, it will be obvious that many modifications and variations of the present invention are possible in light of the above teachings. It is therefore to be understood that, within the scope of the appended claims, the invention may be practiced otherwise than as specifically described.

Having thus described the invention, what is claimed is:

1. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a dead reckoning tracer including a stylus mechanism engaging a recording media and coupled to be actuated by said navigation system ground track signals; a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plural channel memory unit including memory read-in control means operative to couple selected ground track signals to selected memory channels; a computer comprising, cursor bearing signal generating means, range strobe signal generating means, time signal generating means, velocity computing means coupled to said range strobe and time signal generating means to be operative to provide a velocity signal in accordance with said range strobe and time signals, and indicating means respectively coupled to be actuated by cursor bearing and velocity signals; a plurality of means operative to selectively couple said cursor origin control means to selected cursor origin slew signal generators, to selected memory unit channels, or to said navigation system; a plurality of means operative to selectively couple said cursor bearing control means to selected object locating systems, to selected electronic plotter cursor bearing signal generating means, or to said computer cursor bearing signal generating means; a plurality of means operative to selectively couple said cursor range strobe control means to selected object locating systems, to selected electronic plotter range strobe signal generating means, or to said computer range strobe signal generating means; means operative to concurrently couple said ground track plotter stylus mechanism and said cursor bearing control means to a selected electronic plotter cursor bearing signal generating means; and means operative to concurrently couple said ground track plotter stylus mechanism and said cursor range strobe control means to a selected electronic plotter range strobe signal generating means.

2. The combination of claim 1 wherein there is further provided: means operative to concurrently couple said navigation system and said cursor bearing control means to said computer cursor bearing signal generating means; and means operative to concurrently couple said cursor range strobe control means to said computer range strobe signal generating means and said navigation system to said velocity computing means.

3. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a dead reckoning tracer including a stylus mechanism engaging a recording media and coupled to be actuated by said navigation system ground track signals; a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, and a plurality of cursor origin slew signal generating means adapted to be coupled to said cursor origin control means; a computer comprising, cursor bearing signal generating means, range strobe signal generating means, time signal generating means, and velocity computing means coupled to said range strobe and time signal generating means to be operative to provide a velocity signal in accordance with said range strobe and time signals; a plurality of means operative to selectively couple said cursor origin control means to selected cursor origin slew signal generators or to said navigation system; a plurality of means operative to selectively couple said cursor bearing control means to selected object locating systems or to said computer cursor bearing signal generating means; a plurality of means operative to selectively couple said cursor range strobe control means to selected object locating systems or to said computer range strobe signal generating means; means operative to concurrently couple said navigation system and said cursor bearing control means to said computer cursor bearing signal generating means; and means operative to concurrently couple said cursor range strobe control means to said computer range strobe signal generating means and said navigation system to said velocity computing means.

4. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a dead reckoning tracer including a stylus mechanism engaging a recording media and coupled to be actuated by said navigation system ground track signals; a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, and a plurality of cursor origin slew signal generating means adapted to be coupled to said cursor origin control means; a plural channel memory unit including memory read-in control means operative to couple selected ground track signals to selected memory channels; a computer comprising: cursor bearing signal generating means, range strobe signal generating means, time signal generating means, and velocity computing means coupled to said range strobe and time signal generating means to be operative to provide a velocity signal in accordance with said range strobe and time signals; a plurality of means operative to selectively couple said cursor origin control means to selected cursor origin slew signal generators, to selected memory unit channels, or to said navigation system; a plurality of means operative to selectively couple said cursor bearing control means to selected object locating systems or to said computer cursor bearing signal generating means; a plurality of means operative to selectively couple said cursor range strobe control means to selected object locating systems or to said computer range strobe signal generating means; means operative to concurrently couple said navigation system and said cursor bearing control means to said computer cursor bearing signal generating means; and means operative to concurrently couple said cursor range strobe control means to said computer range strobe signal generating means and said navigation system to said velocity computing means.

5. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plural channel memory unit including memory read-in control means operative to couple selected ground track signals to selected memory channels; a computer comprising: cursor bearing signal generating means, range strobe signal generating means, time signal generating means, velocity computing means coupled to said range strobe and time signal generating means to be operative to provide a velocity signal in accordance with said range strobe and time signals, and indicating means respectively coupled to be actuated by cursor bearing and velocity signals; a plurality of means operative to selectively couple said cursor origin control means to selected cursor origin slew signal generators, to selected memory unit channels, or to said navigation system; a plurality of means operative to selectively couple said cursor bearing control means to selected object locating systems, to selected electronic plotter cursor bearing signal generating means, or to said computer cursor bearing signal generating means; a plurality of means operative to selectively couple said cursor range strobe control means to selected object locating systems, to selected electronic plotter range strobe signal generating means, or to said computer range strobe signal generating means; means operative to concurrently couple said ground track plotter stylus mechanism and said cursor bearing control means to a selected electronic plotter cursor bearing signal generating means; and means operative to concurrently couple said ground track plotter stylus mechanism and said cursor range strobe control means to a selected electronic plotter range strobe signal generating means.

6. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a dead reckoning tracer including a stylus mechanism engaging a recording media and coupled to be actuated by said navigation system ground track signals; a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plural channel memory unit including memory read-in control means operative to couple selected ground track signals to selected memory channels; a plurality of means operative to selectively couple said cursor origin control means to selected cursor origin slew signal generators, to selected memory unit channels, or to said navigation system; a plurality of means operative to selectively couple said cursor bearing control means to selected object locating systems or to selected electronic plotter cursor bearing signal generating means; a plurality of means operative to selectively couple said cursor range strobe control means to selected object locating systems or to selected electronic plotter range strobe signal generating means; means operative to concurrently couple said ground track plotter stylus mechanism and said cursor bearing control means to a selected electronic plotter cursor bearing signal generating means; and means operative to concurrently couple said ground track plotter stylus mechanism and said cursor range strobe control means to a selected electronic plotter range strobe signal generating means.

7. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plural channel memory unit including memory read-in control means operative to couple selected ground track signals to selected memory channels; a plurality of means operative to selectively couple said cursor origin control means to selected cursor origin slew signal generators, to selected memory unit channels, or to said navigation system; a plurality of means operative to selectively couple said cursor bearing control means to selected object locating systems or to selected electronic plotter cursor bearing signal generating means; a plurality of means operative to selectively couple said cursor range strobe control means to selected object locating systems or to selected electronic plotter range strobe signal generating means; means operative to concurrently couple said ground track plotter stylus mechanism and said cursor bearing control means to a selected electronic plotter cursor bearing signal generating means; and means operative to concurrently couple said ground track plotter stylus mechanism and said cursor range strobe control means to a selected electronic plotter range strobe signal generating means.

8. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plural channel memory unit including memory read-in control means operative to couple selected ground track signals to selected memory channels; a plurality of means operative to selectively couple said cursor origin control means to selected cursor origin slew signal generators, to selected memory unit channels, or to said navigation system; a plurality of means operative to couple said cursor bearing control means to selected object locating systems; a plurality of means operative to couple said cursor range strobe control means to selected object locating systems; means operative to concurrently couple said ground track plotter stylus mechanism and said cursor bearing control means to a selected electronic plotter cursor bearing signal generating means; and means operative to concurrently couple said ground track stylus mechanism and said cursor range stroke control means to a selected electronic plotter range strobe signal generating means.

9. A display system for use in an aircraft having installed therein a ground reference navigation system, operative to provide signals proportional to aircraft ground track and aircraft heading, and a plurality of object locating systems, each operative to provide signals proportional to the bearing and range of objects with respect to said aircraft, said display system comprising: a ground track plotter including a stylus mechanism engaging a recording media and coupled to be actuated by said navigation system ground track signals, said stylus mechanism further including an aircraft representation coupled to be oriented by said navigation system heading signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plurality of means operative to couple said cursor origin control means to selected cursor origin slew signal generators or to said navigation system; a plurality of means operative to couple said cursor bearing control means to selected object locating systems; a plurality of means operative to couple said cursor range strobe control means to selected object locating systems; means operative to concurrently couple said ground track plotter stylus mechanism and said cursor bearing control means to a selected electronic plotter cursor bearing signal generating means; and means operative to concurrently couple said ground track plotter stylus mechanism and said cursor range strobe control means to a selected electronic plotter range strobe signal generating means.

10. A display system for use in an aircraft having installed therein a ground reference navigation system, operative to provide signals proportional to aircraft ground track, and a plurality of object locating systems, each operative to provide signals proportional to the bearing and range of objects with respect to said aircraft, said display system comprising: a ground track plotter including a stylus mechanism engaging a recording media and coupled to be actuated by said navigation system ground track signals; electronic plotter means comprising, a cathode ray tube system operative to independently generate and display a plurality of rotatable cursors on the screen of a cathode tube and including cursor origin, bearing, and range strobe control means, a plurality of cursor origin slew signal generating means adapted to be coupled to said cursor origin control means, a plurality of cursor bearing signal generating means adapted to be coupled to said cursor bearing control means, and a plurality of cursor range strobe signal generating means adapted to be coupled to said cursor range strobe control means; a plurality of means operative to couple said cursor origin control means to selected cursor origin slew signal generators or to said navigation system; a plurality of means operative to couple said cursor bearing control means to selected object locating systems; a plurality of means operative to couple said cursor range strobe control means to selected object locating systems; means operative to concurrently couple said ground track plotter stylus mechanism and said cursor bearing control means to a selected electronic plotter cursor bearing signal generating means; and means operative to concurrently couple said ground track plotter stylus mechanism and said cursor range strobe control means to a selected electronic plotter range strobe signal generating means.

References Cited by the Examiner
UNITED STATES PATENTS 3,070,793 12/62 Guarino et al. _____ 343—6
3,076,961 2/63 Bibbero _____ 343—6

CHESTER L. JUSTUS, *Primary Examiner.*